US012585443B2

(12) United States Patent
Chauhan et al.

(10) Patent No.: US 12,585,443 B2
(45) Date of Patent: Mar. 24, 2026

(54) COMPILER FOR NEURAL ACCELERATOR

(71) Applicant: Google LLC, Mountain View, CA (US)

(72) Inventors: Arun Chauhan, Belmont, CA (US);
Raksit Ashok, Campbell, CA (US);
Dong Hyuk Woo, San Jose, CA (US)

(73) Assignee: Google LLC, Mountain View, CA (US)

( * ) Notice: Subject to any disclaimer, the term of this patent is extended or adjusted under 35 U.S.C. 154(b) by 976 days.

(21) Appl. No.: 17/637,190

(22) PCT Filed: Mar. 9, 2020

(86) PCT No.: PCT/US2020/021714
§ 371 (c)(1),
(2) Date: Feb. 22, 2022

(87) PCT Pub. No.: WO2021/183105
PCT Pub. Date: Sep. 16, 2021

(65) Prior Publication Data
US 2022/0300826 A1 Sep. 22, 2022

(51) Int. Cl.
*G06F 8/41* (2018.01)
*G06N 3/06* (2006.01)
*G06N 3/063* (2023.01)
*G06N 3/045* (2023.01)
*G06N 3/10* (2006.01)

(52) U.S. Cl.
CPC .............. *G06F 8/41* (2013.01); *G06N 3/06* (2013.01); *G06N 3/063* (2013.01); *G05B 2219/13119* (2013.01); *G05B 2219/23266* (2013.01); *G06N 3/045* (2023.01); *G06N 3/105* (2013.01)

(58) Field of Classification Search
CPC . G06F 8/41; G06N 3/06; G06N 3/063; G06N 3/045; G06N 3/105; G05B 2219/13119; G05B 2219/23266
See application file for complete search history.

(56) References Cited

U.S. PATENT DOCUMENTS

| | | | | |
|---|---|---|---|---|
| 10,789,402 B1 * | 9/2020 | Vemuri | .................. | G06N 3/063 |
| 12,086,572 B1 * | 9/2024 | Wu | .......................... | G06N 3/04 |

(Continued)

FOREIGN PATENT DOCUMENTS

| | | |
|---|---|---|
| CN | 109858621 | 6/2019 |

OTHER PUBLICATIONS

Ahn et al., "Chameleon: Adaptive Code Optimization for Expedited Deep Neural Network Compilation" Jan. 23, 2020, arXiv: 2001. 08743v1, pp. 1-17. (Year: 2020).*

(Continued)

*Primary Examiner* — Miranda M Huang
*Assistant Examiner* — Chase P. Hinckley
(74) *Attorney, Agent, or Firm* — Fish & Richardson P.C.

(57) ABSTRACT

A compiler of a computing device is described that identifies a sequence of neural network models frequently invoked by an application of the computing device, compiles the models in that sequence, and loads a static random access memory (SRAM) of a hardware accelerator with the compiled models only when the same compiled models—from another, but same, sequence that was previously invoked—are not already present in the SRAM. This prevents unnecessary reloading of compiled models into the SRAM, thereby increasing runtime speed and conserving computational energy.

20 Claims, 5 Drawing Sheets

(56)                References Cited

U.S. PATENT DOCUMENTS

| | | | | |
|---|---|---|---|---|
| 12,093,806 | B1 * | 9/2024 | Zejda | G06N 3/045 |
| 2019/0286973 | A1 | 9/2019 | Kovvuri et al. | |
| 2019/0308099 | A1 | 10/2019 | Lalonde et al. | |
| 2019/0354489 | A1 * | 11/2019 | Gupta | G06F 12/128 |
| 2019/0391796 | A1 * | 12/2019 | Brady | G06F 8/458 |
| 2020/0082273 | A1 * | 3/2020 | Rossi | G06N 3/063 |
| 2020/0241856 | A1 * | 7/2020 | Kim | G06N 3/063 |
| 2021/0042259 | A1 * | 2/2021 | Koeplinger | G06F 12/023 |
| 2021/0056389 | A1 * | 2/2021 | Yang | G06N 3/063 |
| 2021/0081806 | A1 * | 3/2021 | Chai | G06N 3/045 |
| 2021/0158131 | A1 * | 5/2021 | Jain | G06N 3/04 |
| 2021/0174214 | A1 * | 6/2021 | Venkatesan | G06N 3/08 |

OTHER PUBLICATIONS

Jiang et al., "Hardware/Software Co-Exploration of Neural Architectures" Jan. 11, 2020, arXiv: 1907.04650v2, pp. 1-10. (Year: 2020).*

Lattner et al., "MLIR: A Compiler Infrastructure for the End of Moore's Law" Mar. 1, 2020, arXiv: 2002.11054v2, pp. 1-21. (Year: 2020).*

Chen et al., "TVM: An Automated End-to-End Optimizing Compiler for Deep Learning" Oct. 2018, pp. 579-594. (Year: 2018).*

Ignatov et al., "AI Benchmark: Running Deep Neural Networks on Android Smartphones" Oct. 15, 2018, arXiv: 1810.01109v2, pp. 1-15. (Year: 2018).*

Gong et al., "Recurrent Embedding Aggregation Network for Video Face Recognition" Jun. 25, 2019, arXiv: 1904.12019v2, pp. 1-10. (Year: 2019).*

Haj-Ali et al., "NeuroVectorizer: End-to-End Vectorization with Deep Reinforcement Learning" Feb. 2020, pp. 242-255. (Year: 2020).*

Huang et al., "AutoPhase: Juggling HLS Phase Orderings in Random Forests with Deep Reinforcement Learning" Mar. 4, 2020, arXiv: 2003.00671v2, pp. 1-12. (Year: 2020).*

Vasilache et al., "Tensor Comprehensions: Framework-Agnostic High-Performance Machine Learning Abstractions" Jun. 29, 2018, arXiv: 1802.04730v3, pp. 1-37. (Year: 2018).*

Zerrell et Bruestle, "Stripe: Tensor Compilation via the Nested Polyhedral Model" Mar. 14, 2019, arXiv: 1903.06498v1, pp. 1-13. (Year: 2019).*

Kaufman et al., "Learned TPU Cost Model for XLA Tensor Program" 2019, pp. 1-6. (Year: 2019).*

Baghdadi et al., "Tiramisu: A Polyhedral Compiler for Dense and Sparse Deep Learning" May 7, 2020, arXiv: 2005.04091v1, pp. 1-9. (Year: 2020).*

Bondhugula, Uday, "High Performance Code Generation in MLIR: An Early Case Study with GEMM" Mar. 1, 2020, arXiv: 2003.00532v1, pp. 1-23. (Year: 2020).*

Jain et al., "The OoO VLIW JIT Compiler for GPU Inference" Jan. 31, 2019, arXiv: 1901.10008v2, pp. 1-7. (Year: 2019).*

Venkataramani et al., "DeepTools: Compiler and Execution Runtime Extensions for RaPiD AI Accelerator" Sep. 2019, pp. 102-110. (Year: 2019).*

Xing et al., "DNNVM: End-to-End Compiler Leveraging Heterogeneous Optimizations on FPGA-based CNN Accelerators" Jul. 25, 2019, arXiv: 1902.07463v2, pp. 1-18. (Year: 2019).*

Einziger et al., "TinyLFU: A Highly Efficient Cache Admission Policy" Nov. 2017, pp. 1-31. (Year: 2017).*

Chen et al., "SLIDE: In Defense of Smart Algorithms over Hardware Acceleration for Large-Scale Deep Learning Systems" Mar. 1, 2020, arXiv: 1903.03129v2, pp. 1-16. (Year: 2020).*

Jia et al., "TASO: Optimizing Deep Learning Computations with Automatic Generation of Graph Substitutions" Oct. 2019, pp. 1-16. (Year: 2019).*

Kumar et al., "Quiver: An Informed Storage Cache for Deep Learning" Feb. 2020, pp. 283-296. (Year: 2020).*

International Preliminary Report on Patentability in International Appln. No. PCT/US2020/021714, dated Sep. 22, 2022, 8 pages.

Office Action in Chinese Appln. No. 202080041079.6, Mailed on Aug. 23, 2024, 13 pages (with English translation).

International Search Report and Written Opinion in International Appln. No. PCT/US2020/021714, dated Dec. 2, 2020, 13 pages.

Extended European Search Report in European Appln. No. 22207462.7, dated Mar. 24, 2023, 6 pages.

Cettei et al., "Code Cache Management in Dynamic Optimization Systems," Thesis for the Degree of Doctor of Philosophy, Harvard University, Division of Engineering and Applied Sciences, May 2004, 111 pages.

Extended European Search Report in European Appln. No. 24212215.8, mailed on Mar. 24, 2025, 12 pages.

Lee et al., "Automated Neural Network Accelerator Generation Framework for Multiple Neural Network Applications," Paper, Presented at Proceedings of the TENCON 2018—2018 IEEE Region 10 Conference, Jeju, South Korea, Oct. 28-31, 2018, pp. 2287-2290.

Office Action in European Appln. No. 24212215.8, mailed on Dec. 10, 2025, 6 pages.

Taher et al., "Virtual Configuration Management: A Technique for Partial Runtime Reconfiguration," IEEE Transactions on Computers, Oct. 2009, 58(10):1398-1410.

* cited by examiner

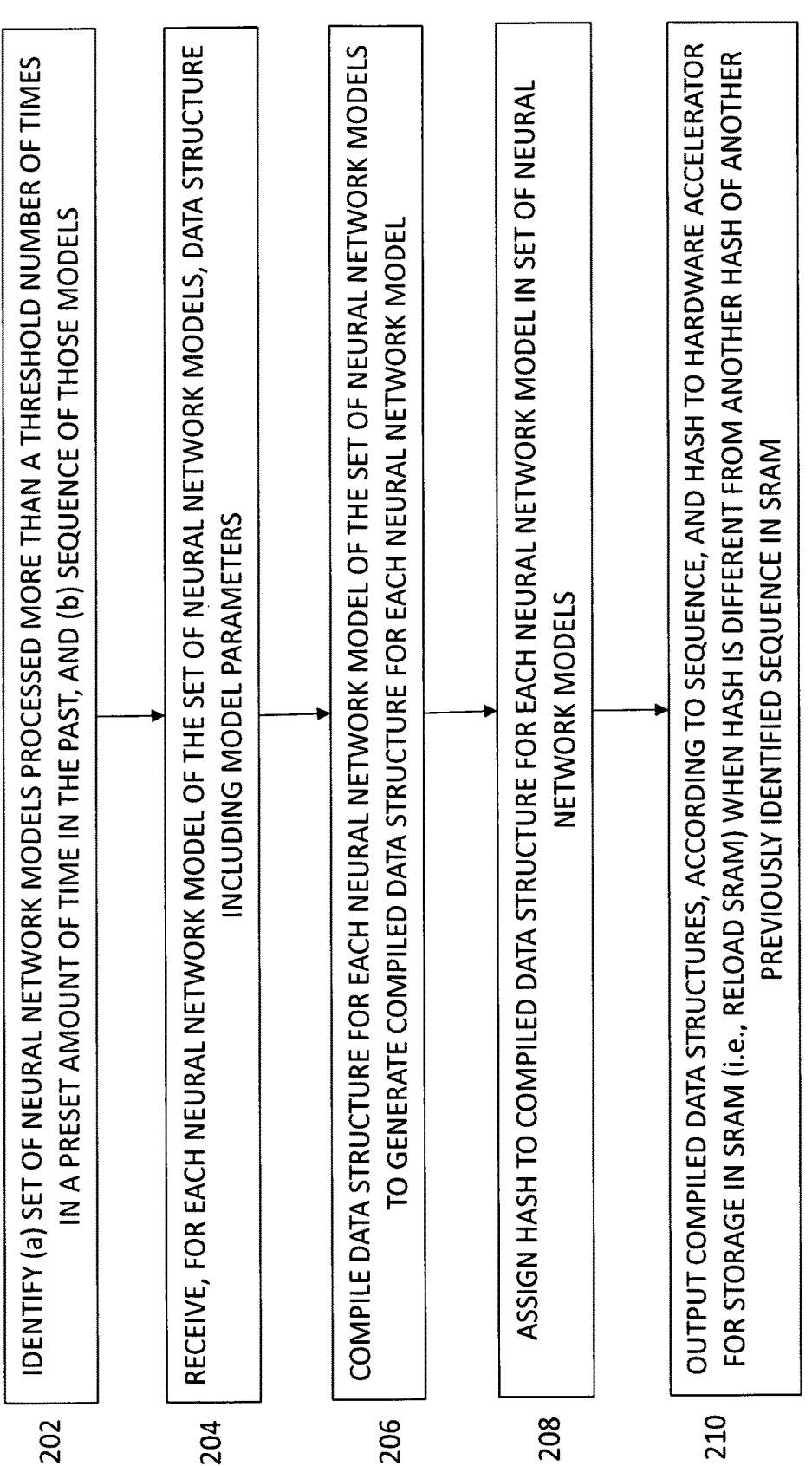

202  IDENTIFY (a) SET OF NEURAL NETWORK MODELS PROCESSED MORE THAN A THRESHOLD NUMBER OF TIMES IN A PRESET AMOUNT OF TIME IN THE PAST, AND (b) SEQUENCE OF THOSE MODELS

204  RECEIVE, FOR EACH NEURAL NETWORK MODEL OF THE SET OF NEURAL NETWORK MODELS, DATA STRUCTURE INCLUDING MODEL PARAMETERS

206  COMPILE DATA STRUCTURE FOR EACH NEURAL NETWORK MODEL OF THE SET OF NEURAL NETWORK MODELS TO GENERATE COMPILED DATA STRUCTURE FOR EACH NEURAL NETWORK MODEL

208  ASSIGN HASH TO COMPILED DATA STRUCTURE FOR EACH NEURAL NETWORK MODEL IN SET OF NEURAL NETWORK MODELS

210  OUTPUT COMPILED DATA STRUCTURES, ACCORDING TO SEQUENCE, AND HASH TO HARDWARE ACCELERATOR FOR STORAGE IN SRAM (i.e., RELOAD SRAM) WHEN HASH IS DIFFERENT FROM ANOTHER HASH OF ANOTHER PREVIOUSLY IDENTIFIED SEQUENCE IN SRAM

FIG. 2

402 — ALLOCATE SRAM FOR STORAGE OF COMPILED DATA STRUCTURE AND HASHES

404 — IF SECOND HASH IS DIFFERENT FROM FIRST HASH, ERASE AND RELOAD SRAM

406 — IF SECOND HASH IS SAME AS FIRST HASH, PREVENT ERASING OR RELOADING OD SRAM

COMPILER FOR NEURAL ACCELERATOR

TECHNICAL FIELD

This disclosure relates to efficient processing of neural network models on a hardware accelerator.

BACKGROUND

Various mobile device applications (e.g., camera application, social media application, or the like) may each need to
use a corresponding neural network model on a hardware
accelerator. Conventionally, the architecture of the hardware
accelerator permits storage of parameters of a single neural
network model in the memory of the hardware accelerator,
and thus a compiler for the hardware accelerator is able to
compile only one neural network model at a time. When
another neural network model (e.g., another model for
another application) needs to be executed, the parameters of
that neural network model replace the parameters of the
previous neural network model. Accordingly, when the
previous neural network model needs to be processed by the
hardware accelerator, parameters of that model are again
loaded into one or more memories of the hardware accel-
erator. Such reloading of the parameters into the memories
can consume significant amounts of memory and power,
thereby causing latency.

SUMMARY

A compiler of a computing device is described that
identifies a sequence of neural network models frequently
invoked by an application of the computing device, com-
piles the models in that sequence, and loads a static random
access memory (SRAM) of a hardware accelerator with the
compiled models only when the same compiled models—
from another, but same sequence that was previously
invoked—are not already present in the SRAM.

In one aspect, a method performed by a compiler is
described. The compiler can identify a first set of neural
network models that have been executed on a hardware
accelerator of a computing device more than a threshold
number of times in a preset amount of time in the past. The
compiler can identify a sequence in which the first set of
models are executed on the hardware accelerator. Each
neural network model of the first set of neural network
models can be compiled for execution by the hardware
accelerator. For each neural network model of the first set of
neural network models, the compiler can output the com-
piled model to the hardware accelerator for storage according to the sequence in one or more memories of the hardware
accelerator. The storage, according to the sequence, of the
compiled model for each neural network model of the first
set of neural network models in the one or more memories
prevents a need for reloading a compiled result recompilation of the sequence of the first set of neural network models
into the one or more memories when the first set of neural
network models are to be executed again on the hardware
accelerator.

In some implementations, the method can further include
one or more of the following aspects, which can additionally
be implemented either individually or in any feasible com-
bination. For each neural network model of the first set of
neural network models, a data structure including param-
eters of the neural network model can be received. The
compiling can further include compiling the data structure
for each neural network model of the first set of neural network models to generate a compiled data structure for
each neural network model of the first set of neural network
models, wherein the compiled data structure is the compiled
model.

A same first hash can be assigned to each compiled model
in the sequence. The first hash can be output along with each
compiled model in the sequence to the hardware accelerator
for storage in the one or more memories of the hardware
accelerator. A same second hash can be assigned to each
compiled model in a second sequence of models. The second
sequence can be subsequent to the first sequence. The
second hash can be same as the first hash when the second
sequence is same as the first sequence. The second hash can
be different from the first hash when the second sequence is
different from the first sequence. If the second hash is
different from the first hash, the hardware accelerator is
configured to replace each compiled model in the first
sequence in the one or more memories with each compiled
model in the second sequence in the one or more memories.
If the second hash is same as the first hash, the hardware
accelerator is configured to prevent erasing each compiled
model in the first sequence from the one or more memories.

Each of the first set of neural network models has been
processed on the hardware accelerator more than a preset
number of times (e.g. five times) in the past. The compiler
compiles the first set of neural network models while the
hardware accelerator simultaneously performs neural net-
work computations of other one or more neural network
models. The identification of the first set of models and the
identification of the sequence can be updated after preset
intervals of time. The compiler can abstain, for a preset time,
from the updating in response to a failure of the compilation
of the first set of neural network models. The abstaining can
include abstaining, for 7500 milliseconds, from the updating
in response to the failure of the compilation of the first set
of neural network models.

The compiling of the first set of neural network models
can include determining that each neural network model
within the first set of neural network models has a particular
size that is compatible for the compiling. The compiling of
the first set of neural network models can include compiling
only a single neural network model at any time. The
sequence can include a face recognition neural network
model and one or more dependent neural network models
that are to be processed after processing the face recognition
neural network model.

In another aspect, a system is described that includes a
compiler and a hardware accelerator. The compiler can
identify a first set of neural network models that have been
executed on a hardware accelerator of a computing device
more than a threshold number of times in a preset amount of
time in the past. The compiler can identify a sequence in
which the first set of models are executed on the hardware
accelerator. The compiler can compile each neural network
model of the first set of neural network models for execution
by the hardware accelerator. For each neural network model
of the first set of neural network models, the compiler can
output the compiled model to the hardware accelerator for
storage according to the sequence in one or more memories
of the hardware accelerator. The hardware accelerator can
include the one or more memories to store the compiled
model for each neural network model of the first set of
neural network models according to the sequence. The
storage according to the sequence of the compiled model for
each neural network model of the first set of neural network
models in the one or more memories can prevent a need for
reloading a compiled result recompilation of the sequence of the first set of neural network models into the one or more memories when the first set of neural network models are to be executed again on the hardware accelerator.

In some implementations, one or more of the following can additionally be implemented either individually or in any feasible combination. The one or more memories can be static random access memory (SRAM). The hardware accelerator can further include a plurality of computing units configured to process the first set of neural network models. Each computing unit of the plurality of computing units can include at least one processor and a memory. The plurality of computing units can be coupled serially via at least one bus. The first set of neural network models can include at least one face recognition neural network model. The at least one face recognition neural network model can be activated in response to the controller receiving an instruction from the computing device to execute the at least one face recognition neural network model.

The computing device can include an application and an application programming interface (API). The application can generate the instruction to be sent via the API. The application can be a camera application. The API can be a Neural Networks API (NNAPI). The computing device can be an Android device.

The subject matter described herein provides many advantages. For example, the simultaneous storage of several compiled models in a sequence in the SRAM of the hardware accelerator prevents a redundant removal from and reloading into the SRAM of same, previously loaded, compiled models of the same sequence that was invoked earlier as well. This avoidance of unnecessary clearing of the SRAM and reloading of compiled data in the SRAM can substantially reduce latency and improve processing speed. Furthermore, the storage of parameters in, and retrieval of those parameters from, the SRAM is significantly faster and more energy efficient than storage in and retrieval from the main memory—i.e., dynamic random access memory (DRAM). Additionally, in the unlikely but possible event that the compilation process fails, the compiler can prevent repeated compilation failures by pausing, for some time, identification of frequently invoked neural network models or the sequence thereof. Furthermore, the compiler can attempt compilation of frequently occurring neural network models only when each of those models has a size lower than a preset amount (e.g., 5 megabytes), which can increase (e.g., maximize) the number of models for which compiled models are simultaneously stored in the SRAM.

The details of one or more variations of the subject matter described herein are set forth in the accompanying drawings and the description below. Other features and advantages of the subject matter described herein will be apparent from the description, the drawings, and the claims.

DESCRIPTION OF DRAWINGS

FIG. 2 illustrates a method performed by a compiler to prevent redundant clearing and reloading of the compiled data in a static random access memory (SRAM) of the hardware accelerator.

Like reference symbols in the various drawings indicate like elements.

DETAILED DESCRIPTION

Figure 1:
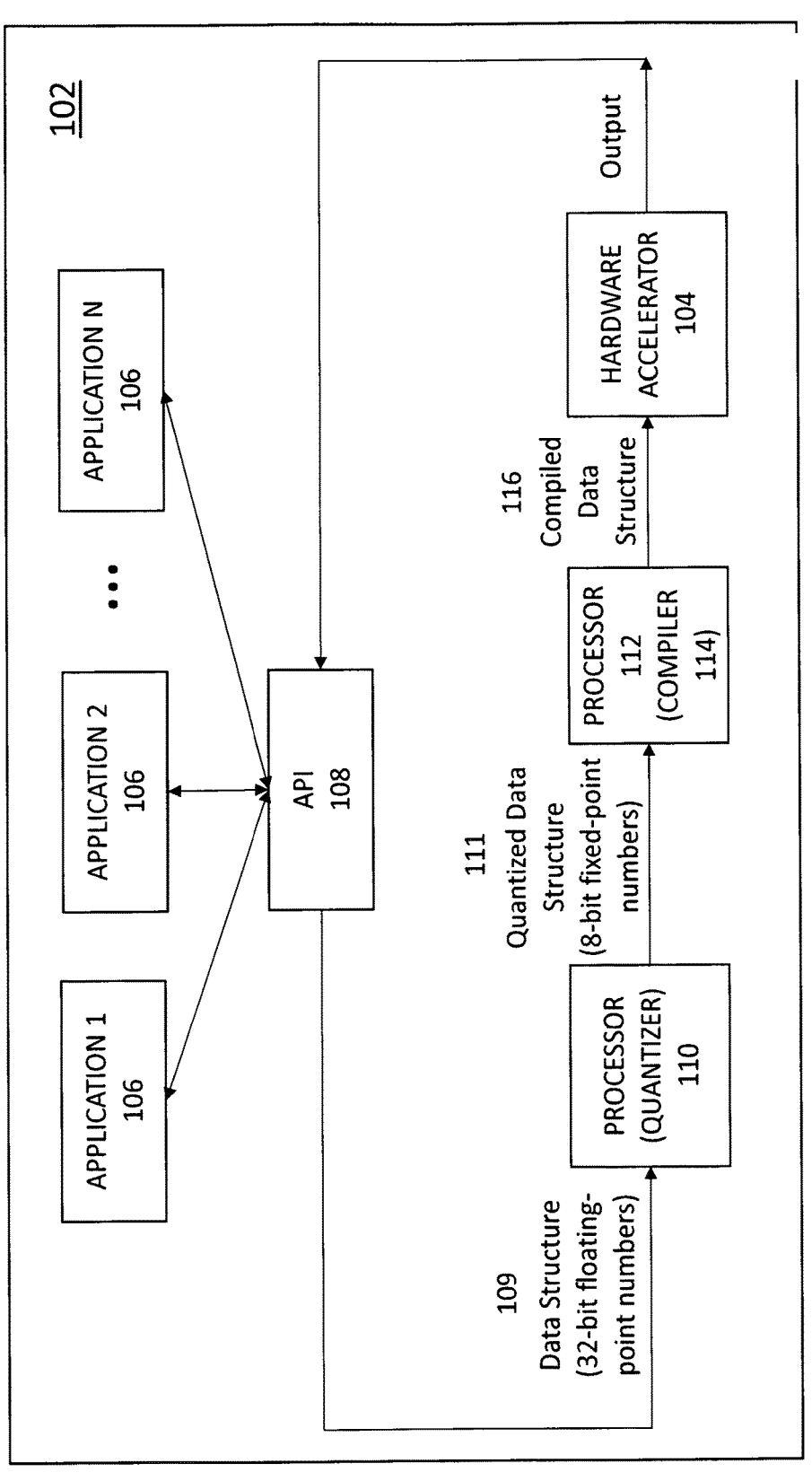
FIG. 1 illustrates a device that has a hardware accelerator that processes neural network models with a reduced latency.

FIG. 1 illustrates a computing device 102 that has a hardware accelerator 104 that processes neural network models with a reduced (e.g., low) latency. The computing device 102 can be a mobile device, such as a phone, a phablet computer, a tablet computer, a laptop, and/or any other mobile device. While the computing device 102 is described as a mobile device, in some implementations, the computing device 102 can be a desktop computer or a cluster or network of computers. The hardware accelerator 104 refers to computer hardware that is specially made to perform some functions more efficiently than possible in software running on a general-purpose processor. For example, the hardware accelerator 104 can perform specified operations using special-purpose hardware, e.g., matrix multiplication, that allow the hardware accelerator to execute deep feed-forward neural networks such as convolutional neural networks (CNNs) much more efficiently than general-purpose processers. In order for the hardware accelerator 104 to execute a neural network model, the neural network model is compiled specifically for the accelerator 104.

The hardware accelerator 104 can be a tensor processing unit (TPU). Although a TPU is described, in other implementations, the hardware accelerator 104 can be any other hardware accelerator 104, such as a graphics processing unit (GPU), digital signal processor (DSP), field-programmable analog array (FPAA), sound card, network processor, cryptographic accelerator, artificial intelligence accelerator, physics processing unit (PPU), data compression accelerator, network on a chip, field programmable gate arrays (FPGA), application specific integrated circuit (ASIC), complex programmable logic device, and/or a system on chip.

The computing device 102 further includes "N" software applications 106, such as a camera application, a social networking application, and any other software application. N can be any integer, such as 5, 10, 20, 100 or any other integer. For these applications 106 to communicate with (e.g., provide inputs to and receive outputs from) the hardware accelerator 106, the mobile computing device 102 further employs an application programming interface (API) 108 that outputs specific data structures to be processed in response to execution of the application 106, a processor 110 to perform quantization (also referred to as quantizer 110) on the specific data structures, and a processor 112 that implements a compiler configured to use the quantized data structures.

The API 108 enables communication between the applications 106 and the processor 110. The API 108 can be a communication protocol (e.g., syntax, semantics and synchronization of communication and possible error recovery methods) that facilitates such communication. The API 108 can, for example, be a neural network API (NN API). The API 108 can allow the applications 106 to generate a data structure, which includes mathematical operations that constitute a neural network model to be processed in response to execution of the application 106. For example, in response to acquisition of images by a camera application 106, the API 108 can allow the camera application 106 to generate a data structure (e.g., TensorFlow data structure) 109 that indicates mathematical operations that constitute a face recognition model that is to be implemented on the accelerator. The data structure 109 can have parameter data (e.g., weights and input data for a neural network) represented as floating-point numbers having a preset number of bits (e.g., 32-bit floating-point numbers).

The processor/quantizer 110 can receive, from the API 108 (or the application 106 in some implementations), the data-structure 109 and convert it into a smaller data structure (e.g., TensorFlowLite data structure) 111 that has the same parameter data (e.g., weights and input data for the neural network model, as in the data structure 109) represented as fixed-point numbers having a lower number of preset number of bits (e.g., 8-bit fixed-point numbers). Converting all the 32-bit floating-point numbers in the data structure 109 to the nearest 8-bit fixed-point numbers in the data structure 111 is referred to as quantization. Quantization advantageously makes the data structure smaller, and thus makes the operations performed by the hardware accelerator 104 on the data faster and less compute intensive. Further, although these lower bit (e.g., 8-bit) representations can possibly be less precise than corresponding higher-bit (e.g., 32-bit) representations in data structure 109, the inference accuracy of the neural network is not significantly (i.e., not noticeably) affected. While quantization is described here as occurring during the API call, in some implementations the quantization can be performed at any time prior to the compilation of the quantized data, as described below. Furthermore, while quantization is described as an automated process in which the quantizer 110 automatically receives data and performs quantization based on that data, in some implementations at least some of the values in the data structure 109 have already been quantized, e.g., at an external system.

The processor 112 implements the compiler 114. The compiler 114 compiles the quantized data structure 111 into a compiled data structure 116, which is compatible with the hardware accelerator 104. In addition to the quantized data structure 111, the compiled data structure 116 can include machine-level code, which includes low level instructions that are to be executed by the hardware accelerator 104. Generally, the compiler 114 can be run on any appropriate operating system e.g., an Android system or Debian-based Linux system.

Further, although quantization and compilation of quantized data is described, in some implementations the quantization is not performed because quantization may not be necessary (e.g. if the hardware accelerator 104 such as a GPU or a TPU is capable of floating point operations, then the compiler 114 can work directly on floating point models without requiring quantization).

The hardware accelerator 104 can perform various neural network computations to process the neural network model (e.g., face recognition model) based on the compiled data structure 116. Every time the hardware accelerator 104 processes the neural network model (e.g., face recognition model), the hardware accelerator 104 needs to access the parameters of that neural network model. For such access, the hardware accelerator 104 includes one or more memories-specifically a static random access memory (SRAM)— that stores such data structure 116, which includes parameters of the neural network model (e.g., face detection neural network model). The parameters are stored in the SRAM rather than a main memory of the computing device 102, because the SRAM allows faster access to data stored therein by the hardware accelerator 104, thereby increasing processing speed and energy efficiency and decreasing latency.

The SRAM on the hardware accelerator 104 has a limited amount of memory space (e.g., up to 8 megabytes) that can store the compiled data structure 116 (which includes parameters) of a model. When data structures with parameters are compiled individually, the compiler 114 gives each compiled data structure a unique hash (e.g., a 64-bit number) for unique identification. When the neural network model is executed at runtime, the hardware accelerator compares that hash to the hash of previously compiled data structures stored in SRAM. If the tokens match, the hardware accelerator uses the stored previously compiled data structure, thereby avoiding the need to reload the compiled data structure 116 into the SRAM. If the tokens do not match, the hardware accelerator 104 wipes/erases the stored data structure (i.e. previously compiled data structure) and writes the compiled data structure 116 instead into the SRAM (i.e. clears and reloads the SRAM) so as to increase (e.g., maximize in some implementations) efficiency for using that limited memory space (e.g., up to 8 megabytes) in the SRAM. However, the hardware accelerator 104 is configured to store data (including parameters) corresponding to a single hash. Therefore, when all compiled data structures 116 have different hashes, after every individual compilation by the compiler 114, the SRAM is reloaded with new compiled data 116, which can cause latency.

The latency caused, and power requirement, due to this reloading of the SRAM after every individual compilation is significantly reduced by the compiler 114 by:

(1) identifying a sequence in which frequently occurring neural network models are executed—e.g., every time a user clicks multiple images using a camera application 106 on the computing device 102, the computing device 102 may invoke and process the following neural network models in a sequence: (a) first a face detection model to detect faces in each image, (b) then an orientation detection model to detect orientations in each image, (c) then a blur-detection model to detect a blur in each image, (d) then another neural network model to suggest the best image based on the detections of (a), (b) and (c);

(2) compiling all the data structures 111 for neural network models in that sequence together to generate multiple compiled data structures 116, where each compiled data structure 116 corresponds to a compilation result for a respective neural network model in that sequence; and (3) outputting the compiled data structures 116 for the models in the sequence to the hardware accelerator 104 for storage according to the sequence in one or more memories—more specifically the SRAM—of the hardware accelerator 104.

Whenever the same frequently occurring sequence of a set of models is invoked again (e.g., in response to the user again clicking multiple images using the camera application 106 on the computing device 102), the hardware accelerator 104 can quickly access the compiled data structures 116 directly from the SRAM, thereby avoiding the need for clearing (i.e. wiping/erasing) the SRAM and reloading it with the same compiled data structures. Avoidance of clearing and reloading of the SRAM can advantageously converse processing resources and power, and improve processing speed, thereby substantially decrease latency.

The simultaneous storage of compiled data structures 116 for all the models in the sequence in the SRAM of the hardware accelerator 104 is performed as follows. Every time the compiler 114 outputs compiled data structures to the hardware accelerator 104, the compiler 114 computes and sends a separate unique hash (e.g., a 64-bit number) for unique identification of the compiled data structure 116. However when multiple compiled data structures 116 are determined for neural network models in a sequence, the compiler 114 allocates a single hash (e.g., a 64-bit number) to identify all those compiled data structures. For example, the compiled data structures 116 for all models in the sequence are assigned the same hash, and a compiled data structure for any model that is not within that sequence would have a different hash. The compiler 114 computes a same hash for same model, and thus a same hash for a same sequence of models. Therefore, if the hash is same as the hash for models for which compiled data structures were previously stored in the SRAM, this indicates that the current sequence of models is same as a previous sequence for which compiled data structures were previously stored, thereby avoiding the need to clear the SRAM and then reload the SRAM with the same compiled data structures. Such prevention of clearing and then unnecessarily reloading the SRAM significantly reduces latency.

The amount of SRAM allocated to each model is fixed at compile-time, and is prioritized based on the order the data structures are compiled by the compiler. For example, when two models A and B within a sequence, where A is invoked before B, are compiled and corresponding data structures 116 are assigned the same hash, as much SRAM space as needed is first allocated to model A's data structure 116, and if SRAM space remains after that, SRAM space is given to model B's data structure 116. If some of the model data structure 116 cannot fit into the SRAM, then it is instead stored in and fetched from an external memory (e.g., main memory of the computing device 102) at run time. If the entire model does not fit in the SRAM, the compiler 114 generates appropriate instructions for the accelerator 104 to fetch the data from the dynamic random access memory (DRAM). Maximal utilization of the SRAM in this manner can advantageously improve (e.g. maximize) processing speed.

In some implementations, if several models are compiled, some models may possibly not be allocated space in SRAM, so those models must load all data from an external memory (e.g., main memory of the computing device 102). Loading from the external memory is slower than loading from the SRAM, but when running the models in a sequence of models that is frequently invoked, this can still be faster than swapping (i.e., clearing and reloading) the SRAM every time any model is run. As noted above, if the entire model does not fit in the SRAM, the compiler 114 generates appropriate instructions that the accelerator 104 executes to fetch the data from the dynamic random access memory (DRAM). Note this interaction between the compiler 114 and the accelerator 104 is different from the conventional central processing units (CPUs) that usually have hardware caches that automatically store the most frequently used data in the SRAM.

The compiler 114 can continue to compile data structures for neural network models while the hardware accelerator 104 simultaneously performs neural network computations of other one or more neural network models. Such simultaneous functionality prevents a pause of processing of neural network models during compilation activity by the compiler, thereby advantageously improving speed and reducing latency.

The compiler 114 can update the identification of the first set of models and the identification of the sequence (i.e., again identify the first set of models and again identify the sequence) after preset intervals of time (e.g., 1 second, 30 seconds, 1 minute, 5 minutes, 10 minutes, 20 minutes, 30 minutes, 1 hour, 24 hours, 5 days, or any other suitable time). Such update ensures that the SRAM is being used optimally to simultaneously store parameters of most relevant models (i.e. models currently or recently determined to be most frequently invoked, as opposed to such determination having been done a long time ago (e.g., more than a threshold time ago)). The compiler can abstain, for a preset time (e.g., 7500 milliseconds), from the updating in response to a failure of the compilation of the first set of neural network models. Abstaining for a preset time can provide protection against transient failures that might otherwise trigger a continuous loop of compilation, leading to significantly increased power consumption. Suspending co-compilation for the preset time after a failure increases the chances that the set of active models would change and thus avoid a recurrence of the compilation failure. In some implementations, the preset time can have another value such as 1 second, 2 seconds, 5 seconds, 10 seconds, 30 seconds, 1 minute, or any other value that can avoid a recurrence of the compilation failure. Such abstention can conserve compilation resources, as immediate compilation using such resources may result in another compilation failure.

The compiling of the first set of neural network models can include determining, prior to the compiling, that each data structure to be compiled is compatible (e.g., in terms of size in megabytes) with the compiler 114. For example, the compiler 114 may not compile data structures having a size greater than a preset amount (e.g., 5 megabytes), which ensures that parameters of that model can be simultaneously stored in the SRAM with parameters of other neural network models.

FIG. 2 illustrates a method performed by the compiler 114 to prevent redundant clearing and reloading of the SRAM. The compiler 114 can identify, at 202, a frequently occurring sequence of neural network models. Frequently occurring sequence of models can be a set of neural network models that are invoked together in a particular sequence by an application 106 and processed by the hardware accelerator 104 more than a threshold number of times in a preset amount of time in the past. For example, users may click multiple images on the phone using the camera application 106 thereon frequently (e.g. more than a threshold number of times), and in such case the frequently occurring models and corresponding sequence can be: (a) first a face detection model to detect faces in each image, (b) then an orientation detection model to detect orientations in each image, (c) then a blur-detection model to detect a blur in each image, (d) then another neural network model to suggest the best image based on the detections of (a), (b) and (c). The threshold number of times for which a sequence needs to be repeated for the sequence to qualify as a frequently occurring sequence can be 5 times, and in other implementations 4 times, 6 times, 10 times, 15 times, 20 times, or any other integer (which is greater than 1) number of times. The preset amount of time in the past that may be considered for this determination may be since the time the hardware accelerator 104 is deployed to perform neural network computations for the corresponding application 106. In another implementation, such preset amount of time in the past may be 1 minute, 5 minutes, 10 minutes, 20 minutes, 30 minutes, 1 hour, 24 hours, 5 days, or any other suitable time. In some implementations, the preset amount of time in the past to be used for determining frequently occurring sequence may be dynamically computed based on usage by a user of one or more applications 106.

The compiler 114 can receive, at 204 for each neural network model within the frequently occurring sequence of neural network models, data structure including model parameters. In some examples, the data structure received by the compiler 114 can have 8-bit fixed-point numbers in a data structure 111, which can be obtained by quantizing, for example, a data structure 109 that has 32-bit floating-point numbers. The model parameters for each neural network model can include weights and data for that neural network model.

The compiler 114 can compile, at 206, data structure for each neural network model in the sequence to generate compiled data structure 116 for each neural network model. Such compilation can be performed in an order of the sequence. For example, a first model in the sequence is compiled first, a second model in the sequence is compiled second, a third model in the sequence is compiled third, and so on until the last model in the sequence is compiled last. Individual models can be compiled using any appropriate technique (including any conventional technique) that performs compilation, by generating machine level code to be accessed and executed by the hardware accelerator 104.

The compiler 114 can assign, at 208, a hash to compiled data structure 116 for each neural network model in set of neural network models. The hash can be a unique 64-bit number for uniquely identifying the compiled data structure 116. While the hash is described as a 64-bit number, in other implementations, it can have any other number of bits. Generally, a hash function receives, as input, the compiled data structure and outputs a hash (e.g., 64-bit number) that can be used, for example, as an index in a hash table. The hash can also be referred to as a hash value, a hash code, or a digest in various implementations. The hash function can be MD5, SHA-2, CRC32, any other one or more hash functions, and/or any combination thereof.

The compiler can output, at 210, compiled data structures, according to the sequence, and the hash to the hardware accelerator 104 for storage in the SRAM (i.e., reload the SRAM) when the hash (e.g., a first 64-bit number) is different from another hash (e.g., a second 64-bit number) of another previously identified sequence in the SRAM. Such reloading of the SRAM is unnecessary when the two hashes are the same, and the compiler 114 thus prevents clearing and reloading of the SRAM in such case. In other words, clearing and reloading of the SRAM is done if a hash of all models in a first sequence is different from another hash of all models in a previous sequence (which indicates that the two sequences are different). If the two hashes are the same, this indicates that the two sequences are the same, and accordingly the SRAM does not need to be cleared and reloaded, thereby reducing latency.

Figure 3:
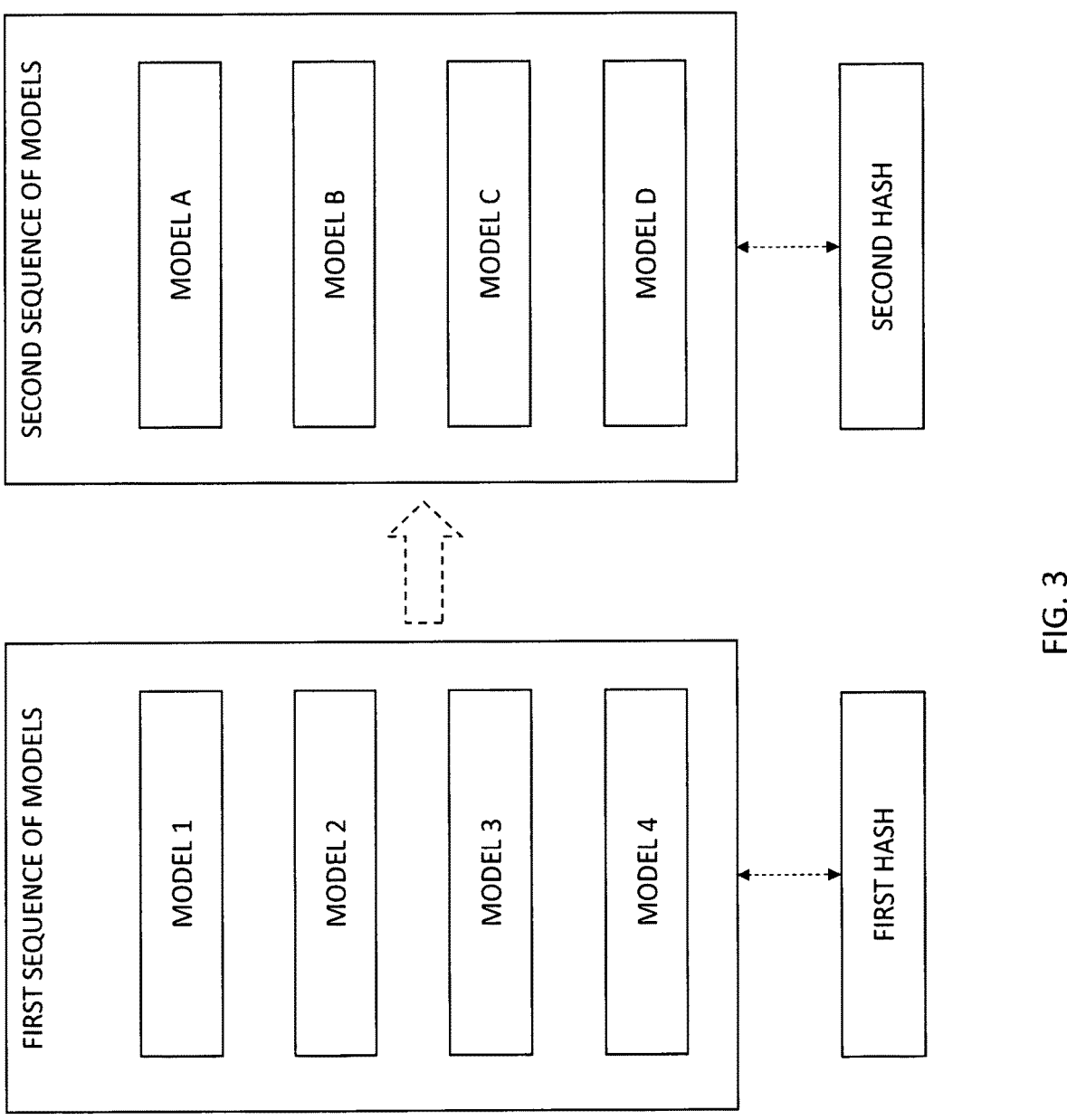
FIG. 3 illustrates two different sequence of models, for which data structures are compiled, along with corresponding hashes, which are compared to determine whether the SRAM needs to be cleared and reloaded with compiled data.

FIG. 3 illustrates two different sequences of models, for which data structures are compiled, along with corresponding hashes, which are compared to determine whether the SRAM needs to be cleared and reloaded with compiled data. Each model in a frequently occurring sequence is assigned a same hash (64-bit unique number). For example, each model of the first sequence shown is assigned a first hash (computed by the compiler), and each model of the second sequence is assigned a second hash (computed by the compiler). The compiler 114 computes a same hash for same model, and thus a same has for a same sequence of models. Therefore, if the second hash is same as the first hash, this indicates that the second sequence is same as the first sequence, and thus the compiled data structures 116 for the second sequence of models do not need to be reloaded in the SRAM of the hardware accelerator 104, thereby reducing latency. In such case, the compiler 114 thus prevents clearing and reloading of the SRAM.

Figure 4:
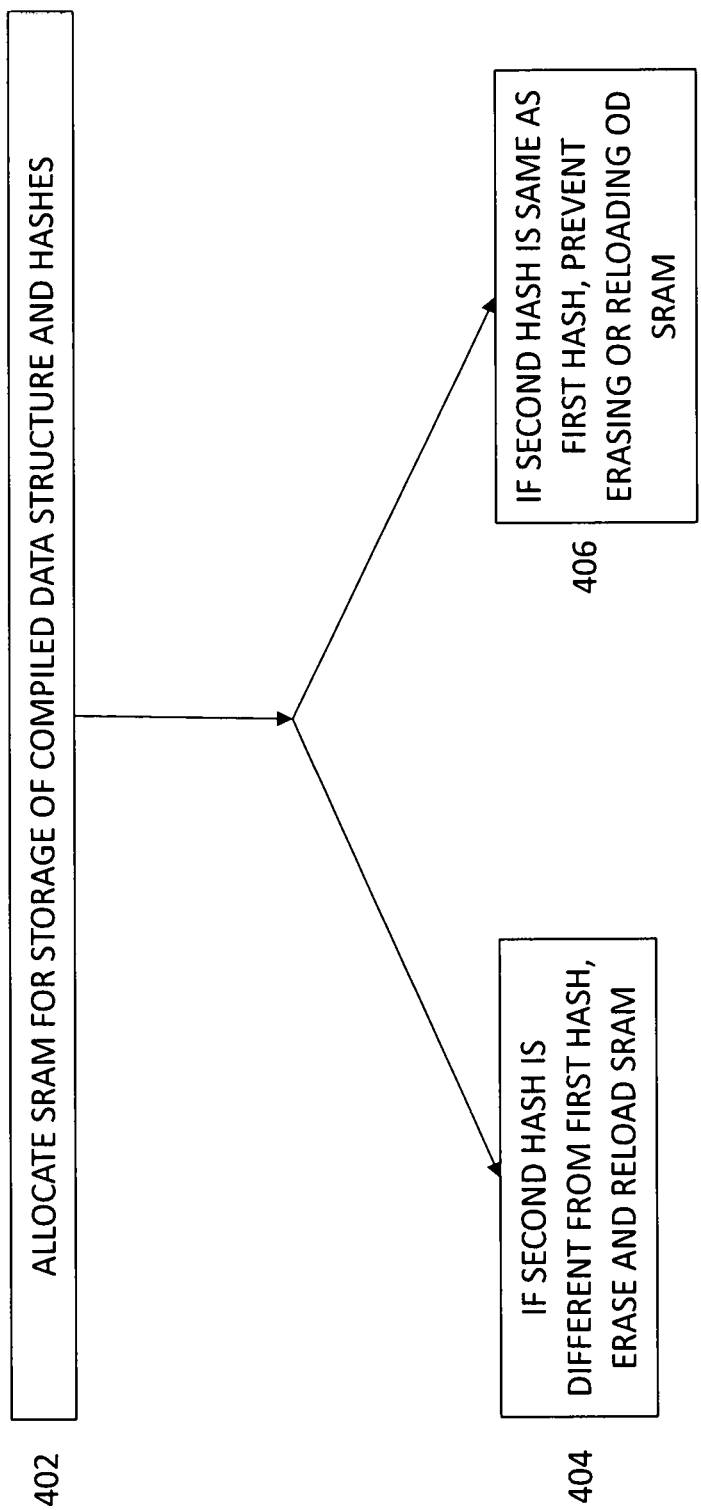
FIG. 4 illustrates steps performed by the hardware accelerator to store compiled data in the SRAM and act in response to a determination of whether existing compiled data in the SRAM needs to be cleared and new compiled data needs to be reloaded in the SRAM.

FIG. 4 illustrates steps performed by the hardware accelerator 104 to store compiled data in the SRAM and act in response to a determination of whether the SRAM needs to be cleared and reloaded. The hardware accelerator 104 can allocate, at 402, SRAM space for storage of compiled data structure 116 and first hash of FIG. 3. If second hash is different from first hash, the hardware accelerator 104 can, at 404, erase the SRAM space for compiled data structure 116 and replace it with a result of compilation of the second sequence. If second hash is same as the first hash, the hardware accelerator 104 can, at 404, avoid erasing compiled data structure 116 from the SRAM, which advantageously reduces latency.

Figure 5:
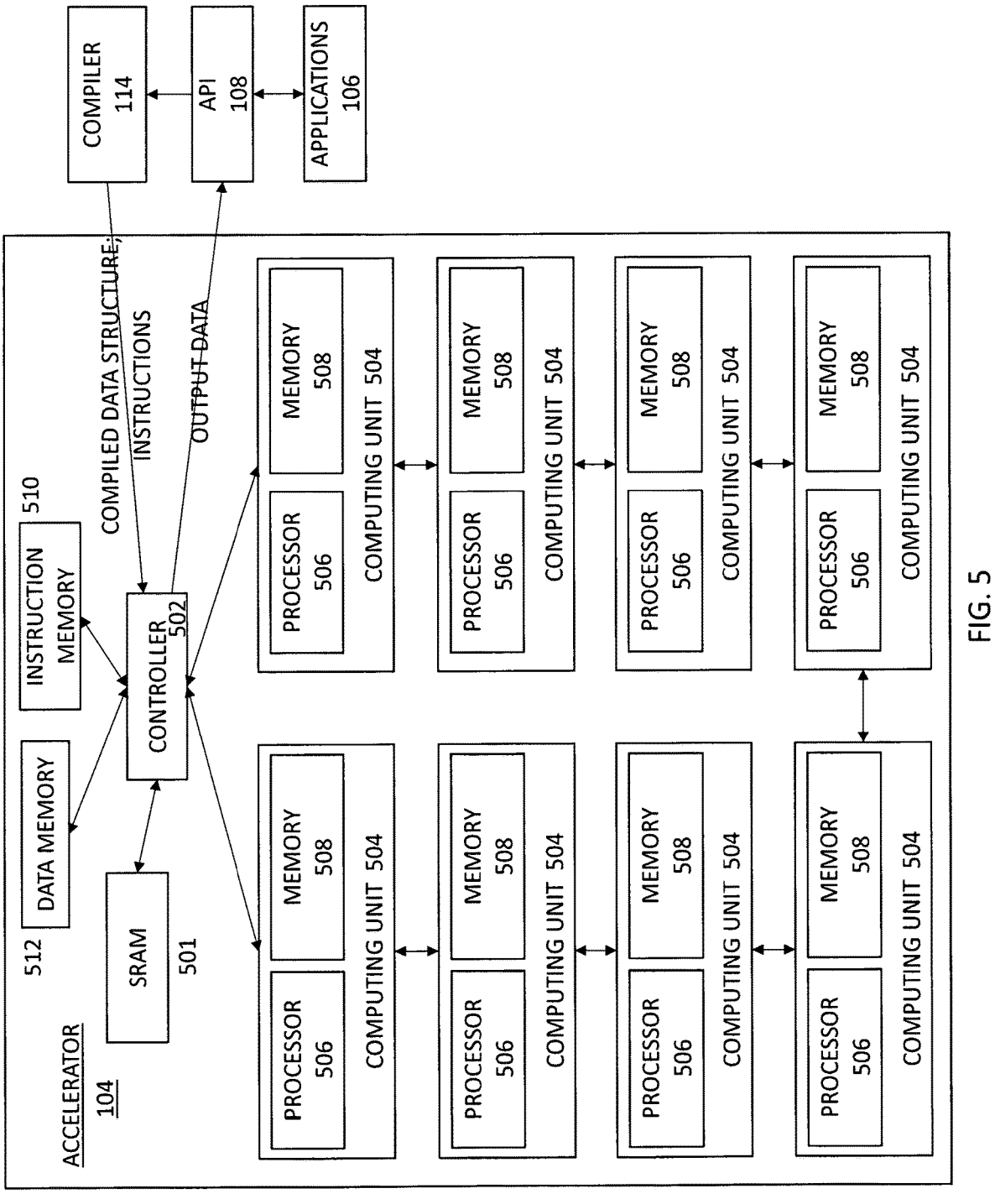
FIG. 5 illustrates aspects of the hardware accelerator that includes the SRAM for storing compiled data, which include parameters for processing neural network models.

FIG. 5 illustrates aspects of the hardware accelerator 104 that includes the SRAM 501 for storing compiled data structures 116, which include parameters for processing neural network models. The hardware accelerator 106 communicates with the application 106 via the application programming interface (API) 108. The API 108 sends data to the hardware accelerator 104 via the compiler, and can output data from the hardware accelerator 104 (e.g., via a decompiler, which is not shown). For example, the API 108 can send to the compiler 114 specific data structures to be processed in response to execution of the application 106. The API 108 may need to send data to the compiler via a quantizer, depending on the configuration of the hardware accelerator 104, as described by FIG. 1.

The hardware accelerator 104 is configured to perform neural network computations in response to instructions and input data received from applications running on a computing device 102. The accelerator 102 can have a controller 502 and multiple separate computing units 504. While eight computing units 504 are shown, in alternate implementations the hardware accelerator 104 can have any other number of computing units 504, such as any number between two and sixteen. Each computing unit 504 can have at least one programmable processor 506 and at least one memory 508. In some implementations, the parameters for processing neural network models, as indicated by the compiled data structures 116, may be distributed across one or more (e.g., all) of the memories 508.

The computing units 504 can accelerate machine learning inference workloads of a neural network layer. Each computing unit 504 is self-contained and can independently execute computations required by a given layer of a multi-layer neural network. The hardware accelerator 104 can perform the computation of a neural network layer by distributing tensor computations across the computing units 504. The computation process performed within a neural network layer may include a multiplication of an input tensor including input activations with a parameter tensor including weights. The computation can include multiplying an input activation with a weight on one or more cycles and performing an accumulation of a products over many cycles. The term tensor as used herein refers to a multi-dimensional geometric object, which can be a matrix or a data array.

Each computing unit 504 can implement a software algorithm to perform tensor computations by processing a nested loop to traverse an N-dimensional tensor (where N can be any integer). In one example computational process, each loop can be responsible for traversing a particular dimension of the N-dimensional tensor. For a given tensor construct, a computing unit 504 can require access to an element of a particular tensor to execute a plurality of dot product computations associated with the tensor. Computation occurs when an input activation is multiplied with a parameter or weight. Tensor computations end when multiplication results are written to an output bus, which serially connects the computing units 504 and over which data is passed between the computing units, and stored in memory.

The hardware accelerator 104 can support specific types of data structures (e.g., structures 109 with 32-bit floating point numbers) that are quantized (e.g., to obtain structures 111 with 8-bit floating point numbers) and then compiled (e.g., to obtain compiled structures 116) specifically for the hardware accelerator 104.

The hardware accelerator 104 can perform various neural network computations to process the neural network model (e.g., face recognition model) based on the compiled data structure 116 generated by the compiler 114. Every time the hardware accelerator 104 processes the neural network model (e.g., face recognition model), the hardware accelerator 104 needs to access the parameters within the compiled data structure 116 of that neural network model. To store the data received from the compiler 114 and the API 108 (including the parameters in the compiled data structure 116), the hardware accelerator 104 further includes an instruction memory 510, the SRAM 501, and a data memory 512.

The SRAM 501 has a limited amount of memory space (e.g., up to 8 megabytes) that can store compiled data structures 116 of a model. To optimally use the SRAM 501, the compiler 114 can identify a sequence in which frequently occurring neural network models are executed, compile all the data structures in that sequence together to generate compiled data structures 116 that are assigned the same identification (e.g. hash), and output the compiled data structures 116 to the SRAM 501 in a selective manner (specifically, only when a different sequence of models is invoked). This prevents redundant reloading of the SRAM 501.

The amount of SRAM 501 allocated to each model is fixed at compile-time, and is prioritized based on the order the data structures are compiled by the compiler. For example, if two models A and B are compiled with the same hash for the compiled models, as much SRAM 501 space as needed is first allocated to model A's data structure, and if SRAM 501 space remains after that, SRAM 501 space is given to model B's data structure. If the data structure of one of the models A or B cannot fit into the SRAM 501, then it is instead stored in and fetched from an external memory (e.g., main memory of the computing device 102) at run time.

If several models are compiled, some models may possibly not be allocated space in SRAM 501, so those models must load all data from external memory. Loading from external loading is slower than loading from the SRAM 501, but when running the models in a frequent sequence, this could still be faster than swapping the SRAM 501 every time any model is run.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

The processes and logic flows described in this specification can be performed by one or more programmable computers executing one or more computer programs to perform functions by operating on input data and generating output(s). The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
identifying a first set of neural network models that have been executed on a hardware accelerator of a computing device more than a threshold number of times in a preset amount of time in the past;
identifying a sequence in which the first set of models were executed on the hardware accelerator;
compiling each neural network model of the first set of neural network models in the sequence for execution by the hardware accelerator and assigning a first hash to the identified sequence of models;
outputting, for each neural network model of the first set of neural network models in the sequence, the compiled model to the hardware accelerator for storage in one or more memories of the hardware accelerator,
compiling a second sequence of neural network models and computing a second hash for the second sequence of neural network models;
determining that the first hash matches the second hash; and
in response, bypassing loading compiled models in the second sequence of neural network models into storage of the hardware accelerator.

2. The method of claim 1, further comprising:
receiving, for each neural network model of the first set of neural network models, a data structure including parameters of the neural network model,
wherein the compiling further comprises compiling the data structure for each neural network model of the first set of neural network models to generate a compiled data structure for each neural network model of the first set of neural network models, the compiled data structure being the compiled model.

3. The method of claim 1, further comprising:
assigning the same first hash to each compiled model in the identified sequence of models;
outputting the first hash along with each compiled model in the sequence to the hardware accelerator for storage in the one or more memories of the hardware accelerator;
assigning the same second hash to each compiled model in the previously compiled sequence of models, the second hash being same as the first hash when the second sequence is same as the first sequence, the second hash being different from the first hash when the second sequence is different from the first sequence, wherein:
if the second hash is different from the first hash, the hardware accelerator is configured to replace each compiled model in the first sequence in the one or more memories with each compiled model in the second sequence in the one or more memories;
if the second hash is same as the first hash, the hardware accelerator is configured to prevent erasing each compiled model in the first sequence from the one or more memories.

4. The method of claim 1, wherein each of the first set of neural network models has been processed on the hardware accelerator more than five times in the past.

5. The method of claim 4, wherein the compiler compiles the first set of neural network models while the hardware accelerator simultaneously performs neural network computations of other one or more neural network models.

6. The method of claim 1, further comprising:
updating the identification of the first set of models and the identification of the sequence after preset intervals of time.

7. The method of claim 6, further comprising:
abstaining, for a preset time, from the updating in response to a failure of the compilation of the first set of neural network models.

8. The method of claim 7, wherein the abstaining comprises:
abstaining, for 7500 milliseconds, from the updating in response to the failure of the compilation of the first set of neural network models.

9. The method of claim 1, wherein the compiling of the first set of neural network models comprises:
determining that each neural network model within the first set of neural network models has a particular size that is compatible for the compiling.

10. The device of claim 1, wherein the compiling of the first set of neural network models comprises:
compiling only a single neural network model at any time.

11. The method of claim 1, wherein the sequence comprises a face recognition neural network model and one or more dependent neural network models that are to be processed after processing the face recognition neural network model.

12. A system comprising:
a compiler configured to:
identify a first set of neural network models that have been executed on a hardware accelerator of a computing device more than a threshold number of times in a preset amount of time in the past;
identify a sequence in which the first set of models are executed on the hardware accelerator;
compile each neural network model of the first set of neural network models in the sequence for execution by the hardware accelerator and assigning a first hash to the identified sequence of models;
output, for each neural network model of the first set of neural network models in the sequence, the compiled model to the hardware accelerator for storage in one or more memories of the hardware accelerator;
compiling a second sequence of neural network models and computing a second hash for the second sequence of neural network models;
determining that the first hash matches the second hash; and
in response, bypassing loading compiled models in the second sequence of neural network models into storage of the hardware accelerator;

the hardware accelerator comprising the one or more memories to store the compiled model for each neural network model of the first set of neural network models according to the sequence, the storage according to the sequence of the compiled model for each neural network model of the first set of neural network models in the one or more memories preventing a need for reloading a compiled result recompilation of the sequence of the first set of neural network models into the one or more memories when the first set of neural network models are to be executed again on the hardware accelerator.

13. The system of claim 12, wherein the one or more memories is static random access memory (SRAM).

14. The system of claim 12, wherein the hardware accelerator further comprises a plurality of computing units, each comprising at least one processor, configured to process the first set of neural network models.

15. The system of claim 14, wherein:

each computing unit of the plurality of computing units further comprises a memory; and the plurality of computing units are coupled serially via at least one bus.

16. The system of claim 12, wherein the first set of neural network models include at least one face recognition neural network model.

17. The system of claim 16, wherein the at least one face recognition neural network model is activated in response to the controller receiving an instruction from the computing device to execute the at least one face recognition neural network model.

18. The system of claim 17, wherein the computing device comprises an application and an application programming interface (API), the application generating the instruction to be sent via the API.

19. The system of claim 18, wherein the application is a camera application.

20. The system of claim 18, wherein:

the API is a Neural Networks API (NNAPI); and the computing device is an Android device.

* * * * *